(12) United States Patent
Li et al.

(10) Patent No.: US 9,100,771 B2
(45) Date of Patent: Aug. 4, 2015

(54) MACHINE TYPE COMMUNICATION EVENT REPORTING METHOD, DEVICE AND SYSTEM

(75) Inventors: Zhijun Li, Shenzhen (CN); Baoguo Xie, Shenzhen (CN); Aiyan Qu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 133 days.

(21) Appl. No.: 13/643,429

(22) PCT Filed: Apr. 1, 2011

(86) PCT No.: PCT/CN2011/072394
§ 371 (c)(1),
(2), (4) Date: Oct. 25, 2012

(87) PCT Pub. No.: WO2011/134336
PCT Pub. Date: Nov. 3, 2011

(65) Prior Publication Data
US 2013/0039277 A1 Feb. 14, 2013

(30) Foreign Application Priority Data
Apr. 26, 2010 (CN) .......................... 2010 1 0171476

(51) Int. Cl.
| | |
|---|---|
| H04W 4/00 | (2009.01) |
| H04W 28/02 | (2009.01) |
| H04L 25/02 | (2006.01) |
| H04L 25/20 | (2006.01) |

(52) U.S. Cl.
CPC ........... *H04W 4/005* (2013.01); *H04L 25/0224* (2013.01); *H04L 25/0228* (2013.01); *H04L 25/202* (2013.01); *H04W 28/0215* (2013.01)

(58) Field of Classification Search
None
See application file for complete search history.

(56) References Cited

U.S. PATENT DOCUMENTS

| | | | |
|---|---|---|---|
| 2006/0223497 A1* | 10/2006 | Gallagher et al. | ............ 455/410 |
| 2008/0186903 A1 | 8/2008 | Hedberg et al. | |
| 2011/0128911 A1* | 6/2011 | Shaheen | ....................... 370/328 |

(Continued)

FOREIGN PATENT DOCUMENTS

| | | |
|---|---|---|
| CN | 101384013 A | 3/2009 |
| CN | 101459899 A | 6/2009 |

(Continued)

OTHER PUBLICATIONS

Author Unknown, Network improvements for MTC feature management, S2-096671, pp. 1-2, Nov. 20, 2009.*

(Continued)

*Primary Examiner* — Christopher Crutchfield

(74) *Attorney, Agent, or Firm* — Koppel, Patrick, Heybl & Philpott

(57) ABSTRACT

Disclosed in the present invention are a Machine Type Communication event reporting method, device and system. The method includes: a mobility management network element acquires identifier information of an MTC server corresponding to an MTC device from a user subscription server; the mobility management network element sends the identifier information to an MTC event reporting entity; and the MTC event reporting entity reports an MTC event of the MTC device to the MTC server corresponding to the identifier information. By way of the present invention, the MTC event report can be sent to a correct MTC server, so that the MTC server can effectively monitor the MTC device.

16 Claims, 4 Drawing Sheets

(56) References Cited

U.S. PATENT DOCUMENTS

2012/0087274 A1* 4/2012 Meriau .................. 370/253
2012/0264451 A1* 10/2012 Kim et al. .................. 455/456.1

FOREIGN PATENT DOCUMENTS

CN  101500290 A  8/2009
CN  101622895 A  1/2010

OTHER PUBLICATIONS

Author Unknown, MTC Features, Ran Enhancements and Related Procedures, R3-100398, pp. 1-4, Jan. 22, 2010.*
Author Unknown, 3GPP TS 22.368 v2.0.0, pp. 1-22, Mar. 2010.*
International Search Report (Form PCT/ISA/210) for PCT/CN2011/072394, mailed Jul. 7, 2011.

* cited by examiner

MACHINE TYPE COMMUNICATION EVENT REPORTING METHOD, DEVICE AND SYSTEM

This is a National Stage Application of PCT/CN2011/072394 filed Apr. 1, 2011, published as WO 2011/134336 A1, and claiming priority from CN201010171476.3 filed Apr. 26, 2010.

FIELD OF THE INVENTION

The present invention relates to the field of communication, and particularly, to a Machine Type Communication event reporting method, device and system.

BACKGROUND OF THE INVENTION

With the development of mobile network service and automatic control technologies, the Machine Type Communication (abbreviated as MTC) mode emerges. The MTC is also referred to as Machine to Machine (abbreviated as M2M) communication mode, in which both parties of the communication are machine devices.

In the M2M communication, the communication activity is controlled automatically, i.e. the initiation and termination of the communication and the control of some access and limitation during communication are all automatic activity. Such activities reply upon the constraint and control of the machine (i.e. terminals in M2M communication) activities in M2M communication. The activities of the terminal in the M2M communication are restrained by the service subscription data, and the network manages the terminal in M2M communication according to the service subscription data.

The most typical communication mode in Machine Type Communication is the communication between the terminal and the application server, wherein the terminal is referred to as MTC user equipment (MTC UE) and the application server is referred to as MTC server.

In the 2G/3G/LTE access network, the M2M communication mainly takes the packet service (abbreviated as PS) network as the underlying bearer network to realize the service layer communication between the MTC user equipment and the MTC server. In particular, the M2M communication entity can access the evolved packet system (abbreviated as EPS) network via the evolved universal mobile telecommunications system terrestrial radio access network (abbreviated as E-UTRAN), and can also can access the general packet radio service (abbreviated as GPRS) via the GSM/EDGE radio access network (abbreviated as GERAN)/UTRAN network. FIG. 1 is a schematic diagram of the architecture of an M2M communication entity accessing the EPS according to the related art. As shown in FIG. 1, the MTC server can serve as the application function (abbreviated as AF) and connect to the policy and charging rules function entity (abbreviated as PCRF) via an Rx interface, so as to realize the control of the bearer. In addition, the MTC server can serve as the SIP AS and connect to the home subscriber server (abbreviated as HSS) via a Sh interface, so as to access the application service data.

In FIG. 1, the MTC UE access the EPS network via the E-UTRAN (eNodeB). After an IP address is allocated thereto, the MTC UE can establish an IP channel with the MTC server so as to realize the upper layer service communication with the MTC server. The IP channel established between the MTC UE and the MTC server can be a logical IP channel, the physical path of which passes through: eNodeB, serving gateway (abbreviated as S-GW or SGW), and packet data network gateway (abbreviated as PDN GW, or P-GW, or PGW).

In the practical application, the MTS server needs to monitor the running state of the MTC UE so as to dynamically and timely learn the current state of the MTC UE and the changes of the state of the MTC UE. In this case, the state change of the MTC UE may include: the MTC UE de-attaches from the network, the MTC UE enters a non-connection state, the MTC UE release the wireless connection, and the current position of the MTC UE changes, etc. All these state changes of the MTC UE can be referred to as an MTC event. The MTC event to be monitored can be defined in the MTC subscription data of the home location register (abbreviated as HLR)/HSS, and sent to the serving general packet radio service support node (abbreviated as SGSN)/MME by the HLR/HSS according to the flow of the MTC UE attaching to the network. However, as to the detection of the MTC event, it usually has to be done by the network entity of the core network. For example, in the EPS network, the network element responsible for detecting the MTC event can be MME/SGW/PGW and so on, and in the GPRS network, the network element responsible for detecting the MTC event can be the SGSN/gateway GPRS support node (abbreviated as GGSN) and so on. After an MTC event has been detected, usually it has to be reported to the MTC server so that the MTC server can timely learn the running condition of the MTC UE.

In the related art, a reporting solution that takes the MME/SGSN as the MTC event detection entity or the GGSN/PGW as the MTC event detection entity is provided.

In this case, if the MME/SGSN is used as the MTC event detection entity, when the current MME/SGSN detects the occurrence of an MTC event, before MTC GW sends the MTC event reported to the MTC server, the MME/SGSN can send the MTC event report to the MTC GW by the following ways: (1) if there is a direct interface between the SGSN/MME and the MTC GW, then the SGSN/MME is used as an MTC event execution entity to directly send the MTC event report to the MTC GW; (2) the SGSN/MME sends the MTC event report to the GGSN/PGW using a GTP-C message with the GGSN/SGW/PGW, and the GGSN/PGW, as the MTC event reporting entity, sends the MTC event report to the MTC GW using a MTCi interface with the MTC GW; and (3) the SGSN/MME sends the MTC event report to the GGSN/PGW using the GTP-C message, and the GGSN/PGW sends the MTC event report to the PCRF using the Gx interface with the PCRF, and the PCRF, as the MTC event reporting entity, sends the MTC event report to the MTC GW using the Rx interface with the MTC GW.

When the GGSN/PGW is the MTC event detection entity, if the GGSN/PGW currently detects the occurrence of an MTC event, before MTC GW sends the MTC event reported to the MTC server, the GGSN/PGW can send the MTC event report to the MTC GW by the following two ways: (1) the GGSN/PGW, as the event report entity, sends the MTC event report to the MTC GW using the MTCi interface with the MTC GW; and (2) the GGSN/PGW sends the MTC event report to the PCRF using the Gx interface with the PCRF, and the PCRF, as the event report entity, sends the MTC event report to the MTC GW using the Rx interface with the MTC GW.

The inventors have found that in the related art when the MTC event detection entity reports the MTC event report, it is not designated which MTC server the MTC event report is to be sent to, which causes that the MTC event report is sent to a wrong MTC server, and then causes that the MTC server cannot effectively monitor the MTC UE.

SUMMARY OF THE INVENTION

The present invention provides an MTC event reporting method and system, so as to solve at least one of the above problems.

An MTC event reporting method is provided according to one aspect of the present invention, comprising: a mobility management network element acquiring identifier information of an MTC server corresponding to an MTC device from a user subscription server; the mobility management network element sending the identifier information to an MTC event reporting entity; and the MTC event reporting entity reporting an MTC event report of the MTC device to the MTC server corresponding to the identifier information.

In this case, the mobility management network element acquiring the identifier information of the MTC server comprises: the mobility management network element sending a request to the user subscription server to request subscription data of the MTC device; and the user subscription server sending the identifier information when sending the subscription data to the mobility management network element.

In this case, the MTC event reporting entity is the mobility management network element.

In this case, the MTC event reporting entity is a core network access gateway, and the mobility management network element sending the identifier information to the MTC event reporting entity comprises: when establishing a bearer for the MTC device, the mobility management network element carrying the identifier information in a bearer establishment request to send to the core network gateway; or the mobility management network element sending the identifier information to the core network gateway when sending the MTC event report to the core network gateway.

In this case, the MTC event reporting entity is a policy and charging rules function entity (PCRF), and the mobility management network element sending the identifier information to the MTC event reporting entity comprises: when establishing a bearer for the MTC device, the mobility management network element carries the identifier information in a bearer establishment request to send to a core network gateway, and the core network gateway sending the identifier information to the PCRF by requesting policy and charging control from the PCRF; or the mobility management network element sending the identifier information to the core network gateway when sending the MTC event report to the core network gateway, and the core network gateway sending the identifier information to the PCRF when sending the MTC event report to the PCRF.

In this case, the identifier information is an IP address of the MTC server.

In this case, the MTC event reporting entity reporting the MTC event report of the MTC device to the MTC server corresponding to the identifier information comprises: the MTC event reporting entity reporting the MTC event report to the MTC server corresponding to the IP address; or, the MTC event reporting entity carrying the IP address in the MTC event report to send to an MTC access gateway, and the MTC access gateway sending the MTC event report to the MTC server according to the IP address.

In this case, the identifier information is the fully qualified domain name of the MTC server.

In this case, the MTC event reporting entity reporting the MTC event report of the MTC device to the MTC server corresponding to the identifier information comprises: the MTC event reporting entity sending the MTC event report to an MTC access gateway, with the MTC event report carrying the fully qualified domain name; the MTC access gateway sending an inquiring request to a domain name server to inquire the IP address corresponding to the fully qualified domain name; and the MTC access gateway receiving the IP address returned by the domain name server, and sending the MTC event report to the MTC server corresponding to the IP address.

In this case, the MTC event reporting entity reporting the MTC event report of the MTC device to the MTC server corresponding to the identifier information comprises: the MTC event reporting entity sending an inquiring request to a domain name server to inquire the IP address corresponding to the fully qualified domain name; and the MTC event reporting entity receiving the IP address returned by the domain name server, and sending the MTC event report to the MTC server corresponding to the IP address.

In this case, the MTC event reporting entity reporting the MTC event report of the MTC device to the MTC server corresponding to the identifier information comprises: the MTC event reporting entity sending an inquiring request to a domain name server to inquire the IP address corresponding to the fully qualified domain name; the MTC event reporting entity receiving the IP address returned by the domain name server, and carrying the IP address in the MTC event report to send to an MTC access gateway; and the MTC access gateway sending the MTC event report to the MTC server according to the IP address.

An MTC event reporting system is provided according to another aspect of the present invention, comprising: a user subscription server, configured to send to a mobility management network element identifier information of an MTC server corresponding to an MTC device; the mobility management network element, configured to send the identifier information to an MTC event reporting entity; and the MTC event reporting entity, configured to report an MTC event report of the MTC device to the MTC server corresponding to the identifier information.

In this case, the MTC event reporting entity is the mobility management network element, a core network gateway or a PCRF.

A mobility management network element is provided according to one aspect of the present invention, comprising: an acquisition module, configured to acquire identifier information of a Machine Type Communication (MTC) server corresponding to an MTC device from a user subscription server; and a sending module, configured to send the identifier information to an MTC event reporting entity of the MTC device.

An MTC event reporting entity is provided according to yet another aspect of the present invention, comprising: an acquisition module, configured to acquire identifier information of an MTC server corresponding to an MTC device from a user subscription server or a mobility management network element; and a sending module, configured to send an MTC event report of the MTC device to the MTC server corresponding to the identifier information.

In the present invention, the user subscription server sends the identifier information of the MTC server corresponding to the MTC device. When reporting the MTC event report, the MTC event reporting entity reports the MTC event report to the MTC server corresponding to the identifier information. This solution solves the problem in the related art that when reporting the MTC event report, it is not designated which MTC server the MTC event report is to be sent to, which causes that the MTC event report is sent to a wrong MTC server, and then causes that the MTC server cannot effectively monitor the MTC UE.

BRIEF DESCRIPTION OF THE DRAWINGS

The drawings described herein provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the drawings and in conjunction with embodiments. It needs to be noted that the embodiments of the present application and the features in the embodiments can be combined with each other if there is no conflict.

Embodiment I

Figure 1:
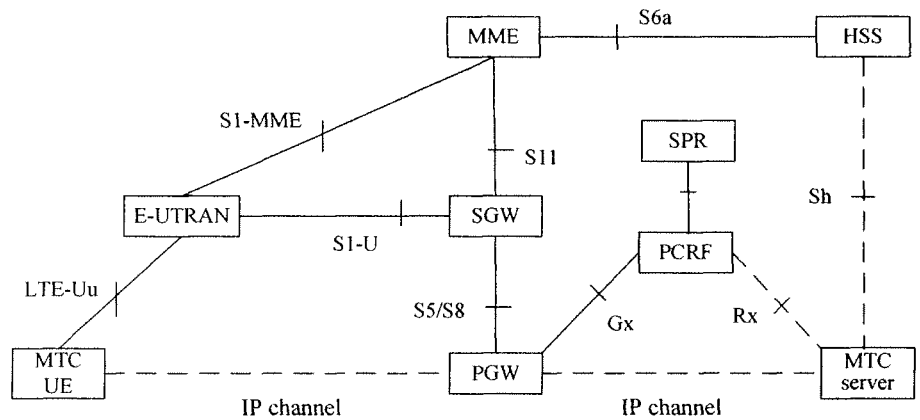
FIG. 1 is a schematic diagram of the architecture of an M2M communication entity accessing the EPS according to the related art.
Figure 2:
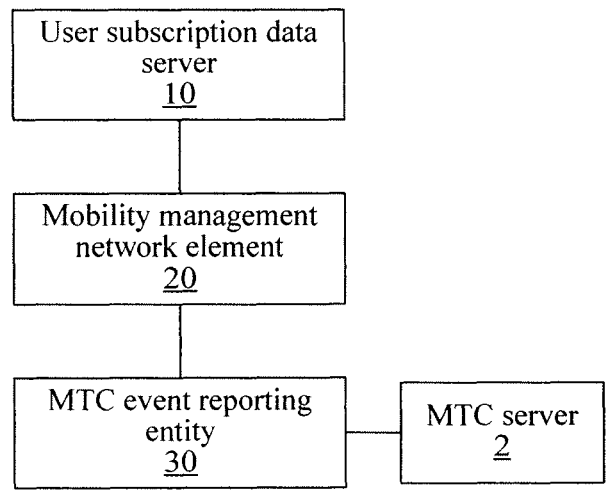
FIG. 2 is a schematic diagram of the structure of a Machine Type Communication system according to embodiment I of the present invention.

FIG. 2 is a schematic diagram of the structure of a Machine Type Communication system according to embodiment I of the present invention. The system comprises: a user subscription data server 10, a mobility management network element 20 and an MTC event reporting entity 30. In this case, the user subscription server 10 is configured to send to the mobility management network element 20 the identifier information of an MTC server 2 corresponding to an MTC device 1; the mobility management network element 20 is configured to send the information of this MTC server to the MTC event reporting entity 30; and the MTC event reporting entity 30 is configured to report an MTC event of the MTC device 1 to the MTC server 2 corresponding to this identifier information.

In this embodiment, if the M2M communication entity accesses the EPS network via the E-UTRAN, then the user subscription server 10 in the above system is the HSS, and the mobility management network element 20 is MME; and if the M2M communication entity accesses the GPRS via the GERAN/UTRAN network, then the user subscription server 10 is the HLR, and the mobility management network element 20 is SGSN.

In the above, the MTC event reporting entity 30 can be mobility management network element 10, also can be a core network gateway (which is PGW in the EPS network and GGSN in the GPRS network), and also can be the PCRF. As such, the system in this embodiment can detect and report the MTC event using any method provided in the related art.

In the related art, since no specific MTC server is designated when the MTC event detection entity and the MTC event reporting entity report an MTC event report, it causes that the MTC event report is sent to a wrong MTC server. However, in this embodiment, the user subscription server 10 sends the identifier information of the MTC server corresponding to the MTC device to the mobility management network element 20, the mobility management network element 20 sends this identifier information to the MTC event reporting entity 30, and the MTC event reporting entity 30 sends the MTC event report to the MTC server corresponding to this identifier information when reporting the MTC event report. Thus, it is ensured that the MTC event can be sent to a correct MTC server and then the MTC server can effectively monitor the MTC device.

Figure 3:
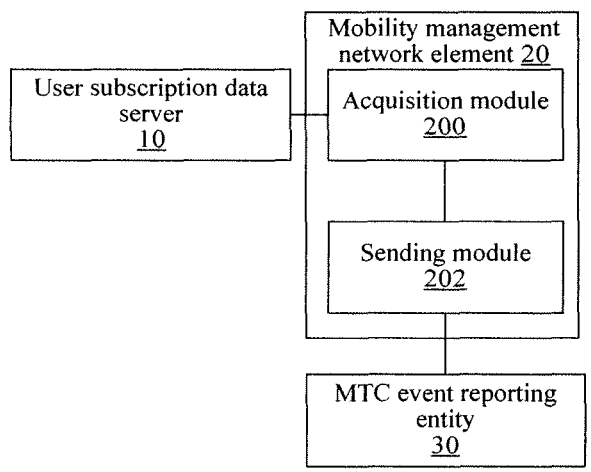
FIG. 3 is a schematic diagram of the structure of a mobility management network element according to embodiment I of the present invention.

FIG. 3 is a schematic diagram of the structure of a mobility management network element 20 according to embodiment I of the present invention. Mobility management network element 20 can comprise: an acquisition module 200 and a sending module 202. In this case, the acquisition module 200 is configured to acquire from the user subscription server the identifier information of the MTC server 2 corresponding to the MTC device 1; and the sending module 202 is configured to send this identifier information to the MTC event reporting entity 30 of the MTC device 1. For example, the acquisition module 200 can acquire the identifier information of the MTC server from the user subscription server 10 by sending a location update request to the user subscription server 10 when the MTC device is attaching to the network.

In the above, if the MTC event reporting entity 30 and the mobility management network element 20 are integrated, i.e. the mobility management network element 20 is used as the MTC event reporting entity 30 to report the MTC event, then the sending module 202 in the mobility management network element 20 does not need to send the identifier information of the MTC server.

By way of this embodiment, the mobility management network element 20 can acquire the identifier information of the MTC server corresponding to the MTC device from the user subscription server 10 and send this identifier information to the MTC event reporting entity 30. Hence, the MTC event reporting entity 30 can report the MTC event report of this MTC device to the MTC server corresponding to this identifier information, thus avoiding reporting the MTC event report to a wrong MTC server.

Figure 4:
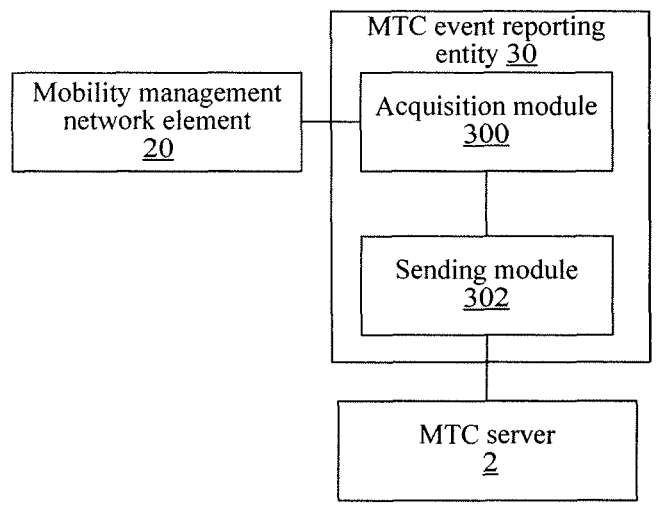
FIG. 4 is a schematic diagram of the structure of an MTC event reporting entity according to embodiment I of the present invention.

FIG. 4 is a schematic diagram of the structure of an MTC event reporting entity 30 according to embodiment I of the present invention. The MTC event reporting entity 30 mainly comprises: an acquisition module 300 and a sending module 302. In this case, if the MTC event reporting entity 30 is mobility management network element 20, then the acquisition module 300 is configured to acquire from the user subscription server 10 the identifier information of the MTC server 2 corresponding to the MTC device 1; and if the MTC event reporting entity 30 is a core network gateway or a PCRF, then the acquisition module 300 is configured to acquire from the mobility management network element 20 the identifier information of the MTC server 2 corresponding to the MTC device 1. The sending module 302 is configured to send an MTC event report of the MTC device 1 to the MTC server corresponding to this identifier information.

By way of the above MTC event reporting entity in this embodiment, the MTC event report of the MTC device can be reported to an MTC server corresponding to this MTC device. It is ensured that the MTC event report can be sent to a correct MTC server.

Figure 5:
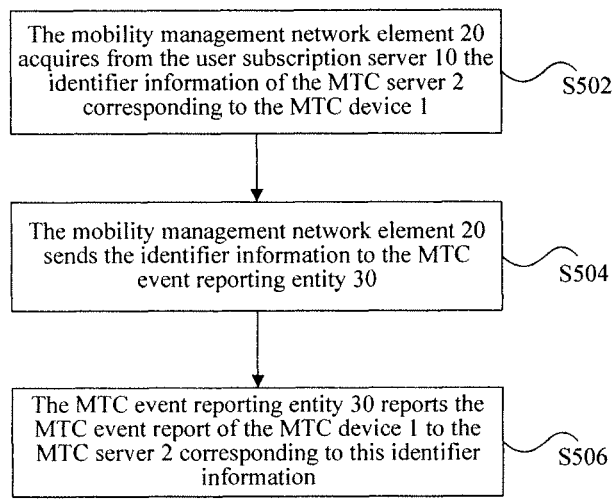
FIG. 5 is a flowchart of an MTC event reporting method according to embodiment I of the present invention.

FIG. 5 is a flowchart of an MTC event reporting method according to embodiment I of the present invention, which method mainly comprises the following steps (steps S502 to S506).

Step S502, the mobility management network element 20 acquires from the user subscription server 10 the identifier information of the MTC server 2 (i.e., the MTC device 1 is connected to the MTC server 2, and the MTC device 1 is managed by the MTC server 2) corresponding to the MTC device 1.

For example, the user subscription server 10 can carry the identifier information of the MTC server 2 in the subscription data of the MTC device 1 to send to the mobility management network element 20.

For example, this identifier information can be the IP address of the MTC server 2, or can be the fully qualified domain name (abbreviated as FQDN) of the MTC server.

Step S504, the mobility management network element 20 sends the identifier information to the MTC event reporting entity 30.

For example, the mobility management network element 20 can send the identifier information to the MTC event reporting entity 30 when establishing a bearer; or, the mobility management network element 20 is used as the MTC event detection entity, and when sending the detected MTC event report to the MTC event reporting entity 30, the mobility management network element 20 can send this identifier information to the MTC event reporting entity 30.

In the above, if the MTC event reporting entity 30 is the mobility management network element 20, then step S504 does not need to be performed.

Step S506, the MTC event reporting entity 30 reports the MTC event report of the MTC device 1 to the MTC server 2 corresponding to this identifier information.

For example, if this identifier information is the IP address of the MTC server 2, then the MTC event reporting entity 30 reports the MTC event to the corresponding MTC server 2 according to this IP address. If this identifier information is the FQDN of the MTC server 2, then the MTC event reporting entity 30 can acquire the address of the MTC server 2 according to this FQDN from the domain name server (abbreviated as DNS), so as to report the MTC event report of the MTC device 1 to the MTC server 2.

In practical application, if there has been a direct interface between the MTC event reporting entity 30 and the MTC server 2, then the MTC event reporting entity 30 can directly send the MTC event report to the MTC server 2. Or, the MTC event reporting entity 30 can also carry the identifier information of the MTC server 2 in the MTC event report to send to an MTC access gateway, and the MTC access gateway sends the MTC event report to the MTC server corresponding to this identifier information according to this identifier information. When the identifier information is FQDN, the MTC event reporting entity 30 can acquire the IP address of the MTC server 2 according to this FQDN and carry this IP address in the MTC event report to send to the MTC access gateway. Or, the MTC event reporting entity 30 can also carry this FQDN in the MTC event report, and the MTC access gateway acquires the IP address of the MTC server 2 from the domain name server according to this FQDN.

By way of the above MTC event report reporting method in this embodiment, the MTC event reporting entity 30 can send the MTC event report of the MTC device to the MTC server corresponding to this MTC device according to the identifier information of the MTC server acquired by the mobility management network element 20 from the user subscription server 10, so that the MTC event report can be sent to a correct MTC server. Thus, it is ensured that the MTC server can effectively monitor the MTC device.

Embodiment II

In this embodiment, it is taken as an example that when the MTC UE is attached to the network, the user subscription server 10 sends the MTC server information corresponding to this MTC UE to the mobility management network element 20.

Figure 6:
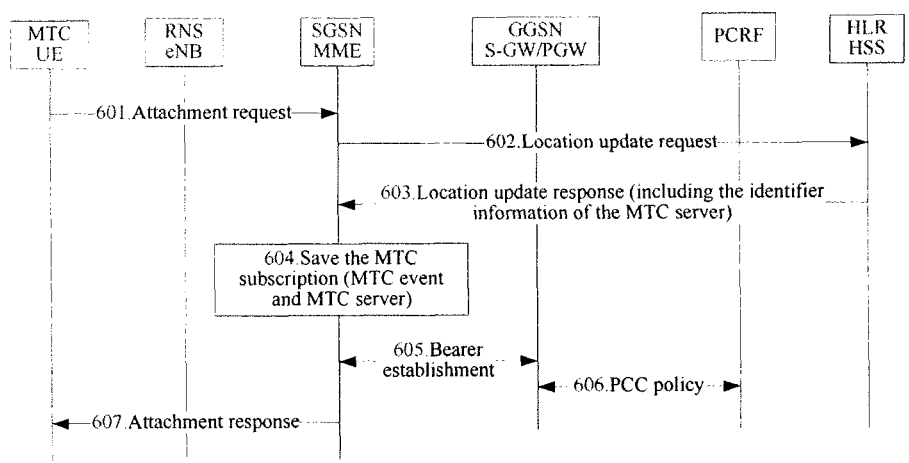
FIG. 6 is a flowchart of sending the identifier information of an MTC server according to embodiment II of the present invention.

FIG. 6 is a flowchart of the user subscription server 10 (HLR/HSS) sending MTC server information to the mobility management network element 20 (SGSN/MME) according to this embodiment. The method mainly comprises the following steps.

S601, the MTC UE requests to be attached to the network.

S602, the SGSN/MME sends a location update request to the HLR/HSS.

S603, in response to the location update request of the SGSN/MME, the HLR/HSS returns a location update response and inserts the user subscription data of the MTC UE into the SGSN/MME.

In the above, when sending user subscription data to the SGSN/MME, the HLR/HSS also contains MTC subscription data in the user subscription data. In the MTC subscription data, the MTC event to be detected by the network, the activities to be taken by the network after an event is detected, etc. are defined.

In the above, when sending user subscription data to the SGSN/MME, the HLR/MME sends the identifier information of the MTC server. The identifier information of the MTC server can be the IP address of an MTC server. The identifier information can also be the FQDN of the MTC server, and the corresponding IP address can be obtained by inquiring the DNS system according to this FQDN.

In the above, the identifier information of the MTC server can be contained in the MTC subscription data, and can also be independent of the MTC subscription data but contained in the user subscription data, or can be independent of the user subscription data.

S604, the SGSN/MME receives the location update response and parses the user subscription data, MTC subscription data and the identifier information of the MTC server from the location update response.

The SGSN/MME can store the MTC server information locally.

S605, optionally, as to an EPS system, the MME may establish a default bearer for the MTC UE, and the MME initiates a bearer establishment request toward the PGW and establishes a default bearer for the MTC UE.

S606, based on S605, during the establishment of the default bearer, the PGW may interact with the PCRF so as to obtain the PCC policy and complete the establishment of the default bearer. The PGW may also acquire the policy from a local policy database.

S607, the SGSN/MME returns an attachment response to the MTC UE, and the MTC UE is successfully attached to the network.

By way of this embodiment, when the MTC UE is attached to the network, the HLR/HSS can send the identifier information of the MTC server which manages the MTC UE to the SGSN/MME. Hence, when subsequently reporting the MTC event report of this MTC UE, the MTC event reporting entity can acquire the identifier information of this MTC server from the SGSN/MME so as to report the MTC event report to the corresponding MTC server.

It needs to be noted that although in this embodiment when the MTC UE is attached, the HLR/HSS sends the user subscription information of this MTC UE and sends the identifier information of the MTC server corresponding to this MTC UE to the SGSN/MME. But it is not limited to this. For example, the SGSN/MME can send a request to the HLR/MME when necessary to request the identifier information of the MTC server corresponding to this MTC UE, and after receiving this request, the HLR/HSS separately sends the identifier information of the MTC server to the SGSN/MME.

Embodiment III

In this embodiment, it is taken as an example that the mobility management network element 20 sends the identifier information of the MTC server 2 to the MTC event reporting entity 30 when establishing a bearer.

Figure 7:
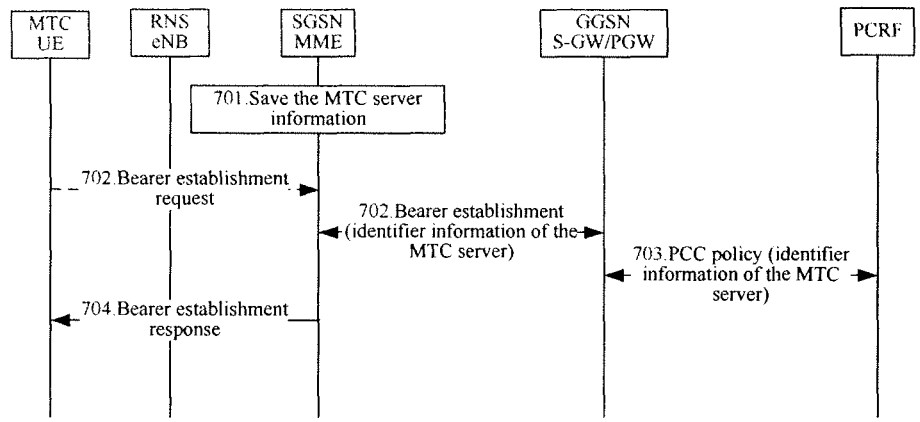
FIG. 7 is a signaling flowchart of an MTC event reporting method according to embodiment III of the present invention.

FIG. 7 is a flowchart of the SGSN/MME sending the MTC server information to the MTC event reporting entity 30 when establishing a bearer for the MTC UE according to this embodiment. The method mainly includes the following steps.

S701, the SGSN/MME obtains the identifier information of the MTC server from the HLR/HSS.

In this step, the SGSN/MME can obtain the information of the MTC server from the HLR/HSS based on the above embodiment II.

S702, if the MTC UE accesses a GPRS system, then the MTC UE initiates a PDP context establishment process to request the SGSN to establish a bearer for the MTC UE; and if the MTC UE accesses an EPS system, corresponding to step S605 shown in FIG. 6, the MME indicates the PGW to establish a default bearer for the MTC UE.

In this step, the SGSN/MME contains the identifier information of the MTC server in a bearer establishment request to transfer to the GGSN/PGW. The GGSN/PGW stores this MTC server information.

If the MTC event reporting entity 30 is the GGSN/PGW, then in this step the GGSN/PGW acquires the identifier information of the MTC server.

S703, based on S702, if the GGSN/PGW needs to acquire policy data from the PCRF during the establishment of the bearer, then the GGSN/PGW requests the PCC policy from the PCRF so as to complete the establishment of the bearer.

In this step, if the MTC event reporting entity 30 is the PCRF, then the GGSN/PGW contains the information about the MTC server in a PCC policy request to transfer to the PCRF, and the PCRF stores this MTC server information.

S704, the establishment of the bearer is completed, and a bearer establishment response is returned.

By way of this embodiment, the mobility management network element can send the identifier information of the MTC server to the MTC event reporting entity by way of the bearer establishment process.

Embodiment IV

In this embodiment, it is taken as an example that the SGSN/MME is an MTC event detection entity and the SGSN/MME sends the identifier of the MTC server to the MTC event detection entity by way of the MTC event report.

Figure 8:
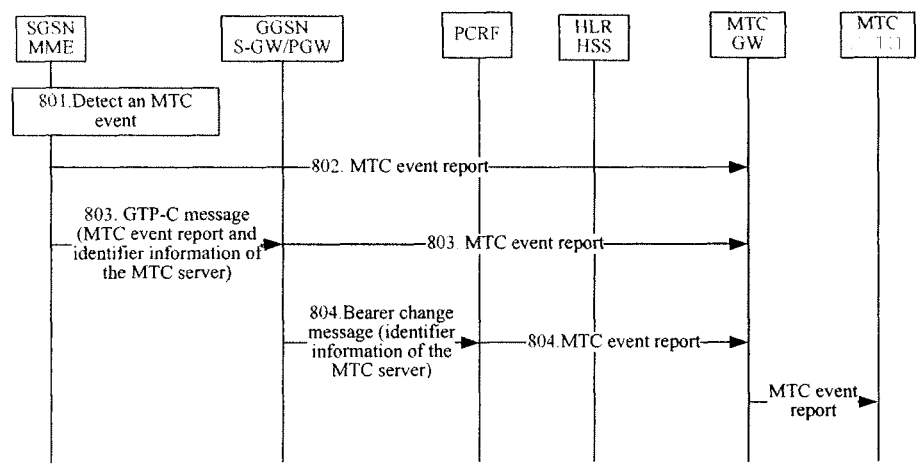
FIG. 8 is a signaling flowchart of an MTC event reporting method according to embodiment IV of the present invention.

FIG. 8 is a flowchart of the SGSN/MME transferring the identifier information of the MTC server to the MTC event reporting entity (GGSN/PGW and PCRF). The method mainly comprises the following steps.

S801, the SGSN/MME detects an MTC event.

When the SGSN/MME detects an MTC event, if the SGSN/MME itself is an MTC event reporting entity, i.e. there is a direct interface between the SGSN/MME and the MTC GW (or MTC Server), then step S802 will be performed. If the MTC event reporting entity is a core network gateway (GGSN/PGW), then step S803 will be performed. If the MTC event reporting entity is the PCRF, then step S804 will be performed after step S803 has been performed.

S802, the SGSN/MME directly sends the MTC event report to the MTC GW (MTC Server), and if it is sent to the MTC GW, then this MTC event report carries the identifier information of the MTC server, and the MTC GW sends the MTC event report to the MTC server corresponding to this identifier information.

S803, the SGSN/MME sends the MTC event report to the GGSN/PGW by a GTP-C message and carries the identifier information of the MTC server in the GTP-C message.

If there is a direct interface between the GGSN/PGW and MTC Server, then the GGSN/PGW sends the MTC event report to the corresponding MTC server. Otherwise, the GGSN/PGW sends the MTC event report to the MTC GW, which MTC event report carries the identifier information of this MTC server, and the MTC GW sends this MTC event report to the MTC server corresponding to this identifier information.

S804, the GGSN/PGW sends the MTC event report to the PCRF by a bearer change request and carries the identifier information of the MTC server in the bearer change request.

If there is a direct interface (Rx) between the PCRF and MTC Server, then the PCRF sends the MTC event report to the corresponding MTC server via Rx. Otherwise, the GGSN/PGW sends the MTC event report to the MTC GW, which MTC event report carries the identifier information of this MTC server, and the MTC GW sends this MTC event report to the MTC server corresponding to this identifier information.

In this embodiment, when the SGSN/MME is used as an MTC event detection entity, the address of the MTC server acquired by the SGSN/MME can be sent to the MTC event detection entity, so that the MTC event report can be sent to a correct MTC server.

It can be seen from the above description of the embodiments of the present invention, the user subscription server sends to the mobility management network element the identifier information of the MTC server corresponding to the MTC device. When reporting the MTC event report, the MTC event reporting entity reports the MTC event report to the MTC server corresponding to the identifier information. This solution solves the problem in the related art that when the MTC event report is reported, the MTC event report is not designated to send to which MTC server, thus causing that the MTC event report is sent to a wrong MTC server and that the MTC server cannot effectively monitor the MTC UE.

Obviously, those skilled in the art should understand that the above module or steps of the present invention can be implemented using a general-purpose computing device. They can be integrated on a single computing device or distributed over a network consisted of multiple computing device. Optionally, they can be implemented using computing device executable program code. Thus, they can be stored in a storage device for being executed by the computing device. In some cases, the shown or described steps can be performed in an order different from the order here. Or, they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in the claims shall comprise any modification, equivalent substitution and improvement within the spirit and principle of the present invention.

What is claimed is:

1. A Machine Type Communication (MTC) event reporting method, comprising:
   a mobility management network element acquiring identifier information of an MTC server corresponding to an MTC device from a user subscription server;
   the mobility management network element sending the identifier information to an MTC event reporting entity; and
   the MTC event reporting entity reporting an MTC event report of the MTC device to the MTC server corresponding to the identifier information;
   wherein the MTC event reporting entity is a policy and charging rules function entity (PCRF), and the mobility management network element sending the identifier information to the MTC event reporting entity comprises:
   when establishing a bearer for the MTC device, the mobility management network element carries the identifier information in a bearer establishment request to send to a core network gateway, and the core network gateway sending the identifier information to the PCRF by requesting policy and charging control from the PCRF; or
   the mobility management network element sending the identifier information to the core network gateway when sending the MTC event report to the core network gateway, and the core network gateway sending the identifier information to the PCRF when sending the MTC event report to the PCRF.

2. The method according to claim 1, wherein
   the mobility management network element acquiring the identifier information of the MTC server comprises: the mobility management network element sending a request to the user subscription server to request subscription data of the MTC device; and the user subscription server sending the identifier information when sending the subscription data to the mobility management network element.

3. The method according to claim 2, wherein the identifier information is an IP address of the MTC server.

4. The method according to claim 3, wherein the MTC event reporting entity reporting the MTC event report of the MTC device to the MTC server corresponding to the identifier information comprises: the MTC event reporting entity reporting the MTC event report to the MTC server corresponding to the IP address; or, the MTC event reporting entity carrying the IP address in the MTC event report to send to an MTC access gateway, and the MTC access gateway sending the MTC event report to the MTC server according to the IP address.

5. The method according to claim 2, wherein the identifier information is a fully qualified domain name of the MTC server.

6. The method according to claim 5, wherein
   the MTC event reporting entity reporting the MTC event report of the MTC device to the MTC server corresponding to the identifier information comprises: the MTC event reporting entity sending the MTC event report to an MTC access gateway, with the MTC event report carrying the fully qualified domain name; the MTC access gateway sending an inquiring request to a domain name server to inquire an IP address corresponding to the fully qualified domain name; and the MTC access gateway receiving the IP address returned by the domain name server, and sending the MTC event report to the MTC server corresponding to the IP address;
   or
   the MTC event reporting entity reporting the MTC event report of the MTC device to the MTC server corresponding to the identifier information comprises: the MTC event reporting entity sending an inquiring request to a domain name server to inquire an IP address corresponding to the fully qualified domain name; and the MTC event reporting entity receiving the IP address returned by the domain name server, and sending the MTC event report to the MTC server corresponding to the IP address;
   or
   the MTC event reporting entity reporting the MTC event report of the MTC device to the MTC server corresponding to the identifier information comprises: the MTC access gateway sending an inquiring request to a domain name server to inquire an IP address corresponding to the fully qualified domain name; the MTC event reporting entity receiving the IP address returned by the domain name server, and carrying the IP address in the MTC event report to send to an MTC access gateway; and the MTC access gateway sending the MTC event report to the MTC server according to the IP address.

7. The method according to claim 1, wherein the identifier information is an IP address of the MTC server.

8. The method according to claim 7, wherein the MTC event reporting entity reporting the MTC event report of the MTC device to the MTC server corresponding to the identifier information comprises: the MTC event reporting entity reporting the MTC event report to the MTC server corresponding to the IP address; or, the MTC event reporting entity carrying the IP address in the MTC event report to send to an MTC access gateway, and the MTC access gateway sending the MTC event report to the MTC server according to the IP address.

9. The method according to claim 1, wherein the identifier information is a fully qualified domain name of the MTC server.

10. The method according to claim 9, wherein
    the MTC event reporting entity reporting the MTC event report of the MTC device to the MTC server corresponding to the identifier information comprises:
    the MTC event reporting entity sending the MTC event report to an MTC access gateway, with the MTC event report carrying the fully qualified domain name;
    the MTC access gateway sending an inquiring request to a domain name server to inquire an IP address corresponding to the fully qualified domain name; and
    the MTC access gateway receiving the IP address returned by the domain name server, and sending the MTC event report to the MTC server corresponding to the IP address;
    or
    the MTC event reporting entity reporting the MTC event report of the MTC device to the MTC server corresponding to the identifier information comprises: the MTC event reporting entity sending an inquiring request to a domain name server to inquire an IP address corresponding to the fully qualified domain name; and the MTC event reporting entity receiving the IP address returned by the domain name server, and sending the MTC event report to the MTC server corresponding to the IP address;

or the MTC event reporting entity reporting the MTC event report of the MTC device to the MTC server corresponding to the identifier information comprises: the MTC event reporting entity sending an inquiring request to a domain name server to inquire an IP address corresponding to the fully qualified domain name; the MTC event reporting entity receiving the IP address returned by the domain name server, and carrying the IP address in the MTC event report to send to an MTC access gateway; and the MTC access gateway sending the MTC event report to the MTC server according to the IP address.

11. The method according to claim 1, wherein the identifier information is an IP address of the MTC server.

12. The method according to claim 11, wherein the MTC event reporting entity reporting the MTC event report of the MTC device to the MTC server corresponding to the identifier information comprises: the MTC event reporting entity reporting the MTC event report to the MTC server corresponding to the IP address; or, the MTC event reporting entity carrying the IP address in the MTC event report to send to an MTC access gateway, and the MTC access gateway sending the MTC event report to the MTC server according to the IP address.

13. The method according to claim 1, wherein the identifier information is a fully qualified domain name of the MTC server.

14. The method according to claim 13, wherein the MTC event reporting entity reporting the MTC event report of the MTC device to the MTC server corresponding to the identifier information comprises: the MTC event reporting entity sending the MTC event report to an MTC access gateway, with the MTC event report carrying the fully qualified domain name; the MTC access gateway sending an inquiring request to a domain name server to inquire an IP address corresponding to the fully qualified domain name; and the MTC access gateway receiving the IP address returned by the domain name server, and sending the MTC event report to the MTC server corresponding to the IP address;

or the MTC event reporting entity reporting the MTC event report of the MTC device to the MTC server corresponding to the identifier information comprises: the MTC event reporting entity sending an inquiring request to a domain name server to inquire an IP address corresponding to the fully qualified domain name; and the MTC event reporting entity receiving the IP address returned by the domain name server, and sending the MTC event report to the MTC server corresponding to the IP address;

or the MTC event reporting entity reporting the MTC event report of the MTC device to the MTC server corresponding to the identifier information comprises: the MTC access gateway sending an inquiring request to a domain name server to inquire an IP address corresponding to the fully qualified domain name; the MTC event reporting entity receiving the IP address returned by the domain name server, and carrying the IP address in the MTC event report to send to an MTC access gateway; and the MTC access gateway sending the MTC event report to the MTC server according to the IP address.

15. A Machine Type Communication (MTC) system, comprising:

a user subscription server, configured to send to a mobility management network element identifier information of an MTC server corresponding to an MTC device;

the mobility management network element, comprising a first hardware processor, configured to send the identifier information to an MTC event reporting entity; and the MTC event reporting entity, comprising a second hardware processor, configured to report an MTC event report of the MTC device to the MTC server corresponding to the identifier information;

wherein the MTC event reporting entity is a policy and charging rules function entity (PCRF), and the first hardware processor sending the identifier information to the MTC event reporting entity comprises:

when establishing a bearer for the MTC device, the mobility management network element carries the identifier information in a bearer establishment request to send to a core network gateway, and the core network gateway sending the identifier information to the PCRF by requesting policy and charging control from the PCRF;

or the first hardware processor sending the identifier information to the core network gateway when sending the MTC event report to the core network gateway, and the core network gateway sending the identifier information to the PCRF when sending the MTC event report to the PCRF.

16. A mobility management network element, comprising a hardware processor, configured to acquire identifier information of a Machine Type Communication (MTC) server corresponding to an MTC device from a user subscription server; and configured to send the identifier information to an MTC event reporting entity of the MTC device;

wherein the MTC event reporting entity is a policy and charging rules function entity (PCRF), and the hardware processor sending the identifier information to the MTC event reporting entity comprises:

when establishing a bearer for the MTC device, the mobility management network element carries the identifier information in a bearer establishment request to send to a core network gateway, and the core network gateway sending the identifier information to the PCRF by requesting policy and charging control from the PCRF;

or the hardware processor sending the identifier information to the core network gateway when sending the MTC event report to the core network gateway, and the core network gateway sending the identifier information to the PCRF when sending the MTC event report to the PCRF.

* * * * *